US011920384B2

(12) United States Patent
Fuchs et al.

(10) Patent No.: US 11,920,384 B2
(45) Date of Patent: Mar. 5, 2024

(54) LOCK FOR A MOTOR VEHICLE

(71) Applicant: Kiekert AG, Heiligenhaus (DE)

(72) Inventors: Carsten Fuchs, Essen (DE); Armin Handke, Duisburg (DE); Johannes Nowak, Wesel (DE)

(73) Assignee: Kiekert AG, Heiligenhaus (DE)

(*) Notice: Subject to any disclaimer, the term of this patent is extended or adjusted under 35 U.S.C. 154(b) by 354 days.

(21) Appl. No.: 17/043,312

(22) PCT Filed: Apr. 9, 2019

(86) PCT No.: PCT/DE2019/100325

§ 371 (c)(1),
(2) Date: Sep. 29, 2020

(87) PCT Pub. No.: WO2019/201384

PCT Pub. Date: Oct. 24, 2019

(65) Prior Publication Data

US 2021/0032910 A1 Feb. 4, 2021

(30) Foreign Application Priority Data

Apr. 20, 2018 (DE) ..................... 10 2018 109 527.9
Jul. 5, 2018 (DE) ..................... 10 2018 116 313.4

(51) Int. Cl.
*E05B 79/08* (2014.01)
*E05B 77/06* (2014.01)
(Continued)

(52) U.S. Cl.
CPC .............. *E05B 79/08* (2013.01); *E05B 77/06* (2013.01); *E05B 79/20* (2013.01); *E05B 2015/041* (2013.01)

(58) Field of Classification Search
CPC .......... E05B 79/08; E05B 79/20; E05B 77/06; E05B 2015/041
See application file for complete search history.

(56) References Cited

U.S. PATENT DOCUMENTS

| | | | | |
|---|---|---|---|---|
| 2015/0315824 | A1* | 11/2015 | Gotzen | E05B 85/243 292/200 |
| 2016/0258194 | A1* | 9/2016 | Rosales | E05B 77/06 |
| 2021/0246692 | A1* | 8/2021 | Fuchs | E05B 79/08 |

FOREIGN PATENT DOCUMENTS

| | | | | |
|---|---|---|---|---|
| DE | 102004001988 | A1 * | 8/2005 | E05B 77/40 |
| DE | 102004001988 | A1 | 8/2005 | |

(Continued)

OTHER PUBLICATIONS

Translation of International Search Report dated Sep. 2, 2019 for PCT/DE2019/100325.

*Primary Examiner* — Kristina R Fulton
*Assistant Examiner* — James Edward Ignaczewski
(74) *Attorney, Agent, or Firm* — Renner, Otto, Boisselle & Sklar, LLP

(57) ABSTRACT

A lock for a motor vehicle, in particular a side door lock, comprising a locking mechanism having a rotary latch and at least one locking pawl, an actuating level chain with at least one actuating level and a release lever, wherein a blocked locking mechanism can be unblocked by means of the release lever, and a coupling element between the actuating lever and release lever, wherein the coupling element can be actuated by means of a mass inertia element which is mounted in the motor vehicle lock, and wherein the mass inertia element can be stored in the motor vehicle lock by means of a plastic mandrel.

18 Claims, 2 Drawing Sheets

(51) Int. Cl.
*E05B 79/20* (2014.01)
*E05B 15/04* (2006.01)

(56) References Cited

FOREIGN PATENT DOCUMENTS

| | | | | | |
|---|---|---|---|---|---|
| DE | 102008005575 | A1 | * | 8/2009 | ............. E05B 77/34 |
| DE | 102008005575 | A1 | | 8/2009 | |
| DE | 202008016949 | U1 | | 5/2010 | |
| DE | 102009032445 | A1 | | 7/2010 | |
| DE | 202012007312 | U1 | | 11/2013 | |
| DE | 202013104118 | U1 | | 12/2014 | |
| DE | 102014001490 | A1 | | 7/2015 | |
| DE | 102014002581 | A1 | | 8/2015 | |
| DE | 102015108737 | A1 | | 12/2016 | |
| DE | 102015118860 | A1 | | 5/2017 | |
| GB | 2201908 | A | * | 9/1988 | ............. B44D 3/166 |
| GB | 2204908 | A | | 11/1988 | |
| JP | S57114059 | | | 7/1982 | |
| JP | H08333937 | A | | 12/1996 | |
| JP | 2001271540 | A | | 10/2001 | |
| KR | 20090075563 | A | * | 7/2009 | ............. E05B 79/10 |
| WO | 2017207422 | A1 | | 12/2017 | |

* cited by examiner

LOCK FOR A MOTOR VEHICLE

FIELD OF DISCLOSURE

The invention relates to a lock for a motor vehicle, in particular a side door lock, comprising a locking mechanism which has a rotary latch and at least one locking pawl, an actuating lever chain, having at least one actuating lever and a release lever, it being possible to unblock a blocked locking mechanism by means of the release lever, and a coupling element between the actuating lever and the release lever, it being possible to actuate the coupling element by means of a mass inertia element mounted in the motor vehicle lock.

BACKGROUND OF DISCLOSURE

A motor vehicle door lock is known from DE 20 2013 104 118 U1, which is provided with a mass inertia blocking means. The motor vehicle lock comprises a locking arrangement which is equipped with a control lever and a coupling element. In this case, the coupling element has a spring arrangement. When the actuating lever is not actuated, the locking arrangement locks, and when the actuating lever is actuated, the locking arrangement is unlocked in a spring-driven manner. If the actuating lever is actuated at an actuating speed which is above a predetermined threshold speed, the mass inertia of the control lever ensures that the actuating lever is actuated at a delay.

Moreover, a motor vehicle lock comprising an actuating lever and a coupling arrangement is known from DE 20 2012 007 312 U1. The actuating lever cooperates with the coupling arrangement such that the actuating lever in question disengages the engaged coupling arrangement and leaves the disengaged coupling arrangement in the disengaged state.

If, in the event of an accident, the actuating lever is actuated at an actuating speed above a particular threshold speed, the actuating lever performs an idle stroke due to the delayed engagement of the coupling arrangement that is caused by the inertia.

A mass inertia-based actuating system for a release lever is known from DE 10 2014 001 490 A1. In this case, the actuating lever cooperates with a coupling lever that is pivotably mounted on the release lever. A spring on the actuating lever meshes with the coupling lever and thus allows the coupling lever to engage when the actuating lever is actuated. In the engaged state, the locking mechanism can be unblocked by means of the release lever. A locking lever is also provided, by means of which the coupling lever can be disengaged, as in the event of an accident caused by inertia.

A further mass inertia-based locking system in a lock for a motor vehicle that has a separate mass inertia element is known from DE 10 2014 002 581 A1. A coupling lever is mounted on an actuating lever and is spring-loaded in a position in which the coupling lever is engaged with the release lever when the actuating lever is actuated.

If a threshold speed for actuating the actuating lever is exceeded, a locking lever acts on the coupling member, so that the coupling element disengages from the release lever. The locking lever in turn abuts the release lever in a spring-loaded manner and can follow the movement of the actuating lever if the actuating lever is actuated at a normal actuating speed. In the event of an accident and therefore an excessive speed of the actuating lever, the control lever cannot follow the movement of the actuating lever as a result of the mass inertia element engaged with the control lever, and engages with the coupling lever. The control lever then causes the coupling lever to be deflected. The release mechanism for the lock can in this case be locked, for example, by the mass inertia element in the deflected state, in which the control lever is engaged with the coupling lever, being fixed so that the locking mechanism cannot be unblocked if the actuating lever is actuated further.

In the mass inertia-based motor vehicle door locks known from the prior art, the mass inertia elements are accommodated on a metal stepped mandrel. The stepped mandrel is in this case used to mount the mass inertia element and as a fastening means for the mass inertia element, it being possible to form or rivet the stepped mandrel on one side, for example. A metal stepped mandrel offers a high degree of stability in relation to the mounting point of the mass inertia element, and a durable mounting location can be provided for the mass inertia element.

SUMMARY OF DISCLOSURE

The problem addressed by the invention, proceeding from the known prior art, is that of providing an improved motor vehicle lock. In particular, the problem addressed by the invention is that of providing a motor vehicle lock which, in relation to mounting the mass inertia element, offers a high degree of functional reliability, is easy to assemble and uses a low number of components. Moreover, the problem addressed by the invention is that of providing an option for fastening the mass inertia lever that is structurally simple and cost-effective.

The problem is solved according to the invention by the features of the disclosure. Advantageous embodiments of the invention can be found in the disclosure. It is noted that the embodiments described in the following are not limiting, but instead any possible variants of the features described in the description and the figures are possible.

The problem addressed by the invention is solved by a lock for a motor vehicle, in particular a side door lock, being provided, which lock comprises a locking mechanism which has a rotary latch and at least one locking pawl, an actuating lever chain having at least one actuating lever and a release lever, it being possible to unblock a blocked locking mechanism by means of the release lever, and a coupling element between the actuating lever and the release lever, it being possible to actuate the coupling element by means of a mass inertia element mounted in the motor vehicle lock, wherein the mass inertia element can be mounted in the motor vehicle lock by means of a plastics mandrel. The design of the motor vehicle lock, according to the invention, thus makes it possible to provide a mounting for a mass inertia element that ensures a high degree of functional reliability. In particular, wear caused by corrosion or damage to the mounting point that is caused by corrosion can be eliminated by using a plastics mandrel for mounting. Moreover, as a result of the plastics mandrel, a cost-effective component can be provided which can be produced or constructed with a high degree of flexibility. A mounting point for the mass inertia element is therefore provided which allows a high degree of functional reliability and at the same time allows a mounting of the mass inertia element to be structurally favorable. A further advantage is that, when selecting the material, the low thermal conductivity and low weight of plastics material can be used for the mounting mandrel, which in turn advantageously effects the functionality and the weight of the motor vehicle lock.

In a lock for a motor vehicle, which is also referred to as a locking system, locking mechanisms are installed which consist of a rotary latch and at least one locking pawl. The locking mechanism in the lock in this case cooperates with a lock holder which is fastened either to the body of the motor vehicle or to the door, panel, sliding door, etc. The relative movement between the lock holder and the rotary latch in this case causes the rotary latch to pivot, and at the same time the locking pawl engages with the rotary latch. There are locking mechanisms having a pre-ratchet and main ratchet which are well known from the prior art.

Depending on the embodiment, there are one-stage or two-stage locking mechanisms which in that case have a pre-ratchet and/or a main ratchet. The locking pawl is in this case preferably brought into engagement with the rotary latch in a spring-loaded manner. In order to unblock, i.e. to release the locking pawl from the rotary latch, a release lever is used. The locking pawl is thereby acted on by the release lever such that the locking pawl disengages from the rotary latch and the rotary latch can move from the ratchet position into an opening position. The movement of the rotary latch is in this case carried out mostly by means of a spring element and/or as a result of a tensile load which results from the lock holder in combination with the door seal.

In order to actuate the release lever, an actuating lever chain having at least one actuating lever is used. The actuating lever can be an inner actuating lever or an outer actuating lever, for example. The release lever is moved by means of the actuating lever and the locking mechanism is unblocked. According to the invention, a coupling element is arranged between the actuating lever and the release lever. The coupling element is capable of disengaging the actuating lever chain, i.e. the actuating chain between, for example, the inner door handle, inner actuating lever and release lever. The disengagement of the actuating lever chain is in this case actuated by means of the mass inertia element. This actuation is achieved by momentum. This momentum can result from a collision of the motor vehicle, for example. Momentum from the collision can, for example, move an outer actuating lever which in turn sets the actuating lever chain into motion. The mass inertia element counteracts this momentum and prevent the release lever from actuating. The momentum is in this case used to actuate the coupling element such that the actuating lever chain is broken. In the unactuated state of the motor vehicle lock, the actuating lever chain is preferably engaged, the coupling being disengaged in the event of momentum on the motor vehicle.

In one variant of the invention, the plastics mandrel extends through at least part of the housing, in particular it being possible to connect the part extending through the housing to the housing by means of forming. The housing of the motor vehicle lock is preferably made of a plastics material. Additionally, the housing can be enclosed at least in regions by a lock plate or a lock case, the lock case or the lock plate preferably being manufactured from a steel sheet. The plastics mandrel in this case projects through the housing and/or the lock plate or the lock case. The plastics mandrel extends so far through the housing and/or the lock case or the lock plate that it is possible to fasten the plastics mandrel to the motor vehicle lock. The plastics mandrel can advantageously be connected to the motor vehicle lock by means of forming. In this case, the plastics mandrel can be cylindrical, for example, and can extend through a bore and/or a sleeve of the housing so that additional stabilization of the mounting of the mass inertia element can be made possible.

In an advantageous variant of the invention, the forming can be carried out by means of an ultrasonic method. The part of the plastics mandrel that extends through the housing or projects out of the housing can be formed by means of an ultrasonic method, so that a non-detachable connection is produced, for example in the form of a rivet head. The housing can also have an insertion bevel or chamfer, for example, into which at least part of the formed plastics material of the plastics mandrel can be shaped so as to additionally fixedly secure the plastics mandrel. Forming by means of an ultrasonic method or ultrasonic riveting in this case offers the advantage of high process reliability and a cost-effective mounting method in order to achieve a mounting point for the mass inertia element.

In a further variant of the invention, the plastics mandrel has at least one joining face, in particular a joining face for accommodating the mass inertia element. The installation space in a motor vehicle lock is limited, and therefore the mass inertia element can be arranged parallel to other components, for example levers, gear wheels or discs in the motor vehicle lock. In this case, distancing discs, guide discs or spacers are required in order to be able to ensure reliable actuation of the components of the motor vehicle lock. According to the invention, the plastics mandrel can have at least one joining face which can also fulfil a number of functions. The joining face can be used to securely position the mass inertia element, so as to allow the mass inertia element to be oriented and stably positioned in the motor vehicle lock. Moreover, the joining face can be dimensioned or designed to be sufficiently large that the joining face can simultaneously be used for guiding, stabilizing or as a conductor for further components in the motor vehicle lock. The joining face can advantageously be integral with the plastics mandrel. The joining face can also be used as a stop face for the plastics mandrel or as the mounting element for the mass inertia element, for example in the case in which the plastics mandrel extends partially through a bore and/or opening and/or sleeve of the housing, and therefore the joining face can be simultaneously used as a stop face and/or counter-mounting for forming the part of the plastics mandrel that extends through the housing.

In a further embodiment of the invention, it is advantageous for the plastics mandrel to be frictionally, form-fittingly or integrally connectable to the mass inertia element. This produces the previously described advantages for mounting the plastics mandrel in the motor vehicle lock, and at the same time the plastics mandrel can be used to fasten the mass inertia element in the motor vehicle lock. The plastics mandrel is therefore not only tasked with mounting the mass inertia element, but the plastics mandrel can also simultaneously be used for positioning, fixing and/or stabilizing the mass inertia element in the motor vehicle lock. Depending on the embodiment of the stepped mandrel, it is in this case conceivable for the plastics mandrel to be used exclusively as a mounting point for the mass inertia element, so that the mass inertia element moves relative to the plastics mandrel, and it is also conceivable for the plastics mandrel to be rigidly connected to the mass inertia element, so that the plastics mandrel also moves if the mass inertia element is deflected or pivoted. Depending on the embodiment of the motor vehicle lock, it can in this case be advantageous to connect the plastics mandrel to the mass inertia element in a frictional manner, for example by means of a screw connection, in a form-fitting manner, for example in the form of a screw connection, and/or in an integral manner, for example in the form of an adhesive method. Of course, combined mounting and/or combined holding of the mass inertia element on the plastics mandrel is also conceivable according to the invention.

In a further variant, the mass inertia element has at least one recess which cooperates with the plastics mandrel. The mass inertia element can advantageously be adaptable to the shape of the plastics mandrel. This is advantageous, for example, if a form fit is intended to be produced between the mass inertia element and the plastics mandrel. A form-fitting engagement between the plastics mandrel and the mass inertia element can allow reliable transmission of a torque. Moreover, a cooperating recess between the mass inertia element and the plastics mandrel can be used to ensure secure mounting for the mass inertia element, specifically when the mass inertia element has only one installation position as a result of its design, so that incorrect mounting can be prevented.

The plastics mandrel can advantageously be guided through the mass inertia element. In the case of the plastics mandrel being guided through the mass inertia lever, secure mounting for the mass inertia element can in turn be provided, and at the same time the plastics mandrel can be used, for example, for further mounting in a housing cover, for example. It is naturally also conceivable for the plastics mandrel to extend through the housing on both sides of the housing of the motor vehicle lock, so that the plastics mandrel makes it possible to connect the motor vehicle lock housing, in particular a housing cover, to a housing base. The housing can preferably be detachably connected by means of the plastics mandrel.

In a further variant of the invention, the plastics mandrel can be latched to the mass inertia element, in particular can be latched in the form of a bayonet catch. If the plastics mandrel extends at least in regions through the mass inertia element through at least one, but possibly also two, three or more recesses in the mass inertia element, secure mounting can be provided and it is also simultaneously possible for the mass inertia element to be secured on the plastics mandrel by means of after joining the mass inertia element on the plastics mandrel and pivoting the mass inertia element. The form-fitting connection and in particular connecting by means of a bayonet-type catch allows a reliable, rapid, cost-effective and secure connection between the mass inertia element and the plastics mandrel. A form-fitting, in particular bayonet-type catch makes it possible to securely hold the mass inertia element and ensure reliable functioning of the mass inertia element in the pivot region of the mass inertia element. A bayonet-type catch is used in particular for this purpose, with it being possible to firstly connect the mass inertia element to the plastics mandrel, and the mass inertia element obtaining a secure mounting point after the plastics mandrel is introduced into the lock housing. The plastics mandrel can also advantageously have a joining aid in relation to the lock housing, so that secure positioning can also be achieved in relation to introducing the plastics mandrel into the housing. A secure joint can therefore advantageously be produced or supplemented for the mass inertia element, in particular in the form of a bayonet catch, and a joining means can be provided or supplemented in relation to the housing of the motor vehicle lock.

In a further advantageous variant of the invention, the mass inertia element is manufactured at least in part from a plastics material. Manufacturing the mass inertia element from a composite material made of plastics material and for example iron is advantageous in that a sufficient mass can be provided in the mass inertia element and that plastics parts of the mass inertia element are available for abutting the plastics mandrel. Moreover, the production of the mass inertia element from a composite material offers the advantage that corrosion or a reduction in oxygen on the surface of the mass inertia element can be prevented. Impurities and/or damage on the mass inertia element can influence the mounting on the plastics mandrel and influence the functionality of the mass inertia element. The design, according to the invention, of a plastics mandrel in combination with a mass inertia element manufactured at least in part from plastics material provides a material combination which can function at least predominantly independently of negative metal influences.

In a further variant of the invention, it is advantageous for the plastics mandrel to be formed as one piece, in particular as a one-piece plastics injection-molded part. The one-piece design of the plastics mandrel and in particular its manufacture as a plastics injection-molded part offers a high degree of design freedom and simultaneously offers the possibility of allowing the plastics mandrel a further function. By designing the plastics mandrel as one piece, it is possible to create splash protection in relation to a fastening of the mounting mandrel, for example. Should moisture reach into the part of the plastics mandrel that is connected to the housing, an integrally connected joining face prevents moisture from entering the mounting region of the mass inertia element. The plastics mandrel therefore has, at the same time, a sealing function in relation to the mounting point of the mass inertia element. The variants shown allow a high degree of functional reliability while simultaneously reducing the number of components, and the advantage of greater design freedom and a lightweight design of the motor vehicle lock.

In a further variant of the invention, the plastics mandrel has a joining face, it being possible to design the joining face such that a spring preload can be introduced into the mass inertia element. The mass inertia element is preferably connected to the plastics mandrel by means of a bayonet catch. In terms of manufacturing and functionality, tolerances between the stepped mandrel and the mass inertia element can be provided and/or are necessarily required, since the mass inertia element moves relative to the plastics mandrel in the lock or locking system. A manufacturing clearance between the mass inertia element and the recess in the plastics mandrel is approximately 0.5 mm. Applying a spring preload to the mass inertia element, according to the invention, can, in relation to the manufacturing tolerance, prevent an unintended movement of the mass inertia element. Noises such as rattling can therefore advantageously be prevented.

In a further variant, the spring preload can be introduced into the mass inertia element by means of at least one tab, in particular two, three or more tabs, which are molded into the joining face. The integration of spring elements into the joining face offers the advantage that secure mounting of the mass inertia element in the locking system can be made possible using as small a number of components as possible. The plastics mandrel and in particular the joining face molded on the plastics mandrel can in this case comprise tabs which are integrally molded in and, within the context of manufacturing, project beyond the surface of the joining face that is oriented in the direction of the mass inertia element. A spring preload can therefore be easily transmitted to the mass inertia element as a result of the movability of the tabs. In other words, the tabs protrude at least in regions beyond the joining face, so that the tabs are deformed when the mass inertia element is mounted on the plastics mandrel.

The deformation of the tabs integrally molded on the plastics mandrel then causes a spring preload in the direction of the mass inertia element.

At least two tabs which are molded into the joining face symmetrically can advantageously be provided. A symmetrical arrangement of the tabs offers the advantage of uniform force transmission or introduction of a spring preload onto the mass inertia element. If the mass inertia element is connected to the plastics mandrel by means of a bayonet catch, the plastics mandrel has arms which interact with recesses in the mass inertia element. The tabs can preferably match the arms of the plastics mandrel at least in terms of the orientation thereof, so that a spring preload can be achieved in the direction of the arms and in a targeted manner in the direction of the extension of the arms on the plastics mandrel. A symmetrical arrangement is only advantageous if the mass inertia element has corresponding geometries.

It can therefore also be advantageous for the orientation and number of tabs in the joining face to be oriented and formed in number in relation to the geometric design of the mass inertia element and in particular the mass of the mass inertia element. A spring force can therefore be suitably exerted on the corresponding mass of the mass inertia element. The mass of the mass inertia element is advantageously balanced in relation to a central axis of the plastics mandrel. This means that the center of gravity of the mass inertia element coincides with the central axis of the plastics mandrel. A symmetrical arrangement of the tabs in the joining face can be advantageous in particular in this embodiment.

In a further variant of the invention, the tabs extend radially outward in the joining face from a central axis of the stepped mandrel. A spring preload can advantageously be introduced into the mass inertia element on the radially outer circumference of the joining face. This is advantageous in that a leverage that is as great as possible is available for being introduced into the mass inertia element. In this case, leverage is understood to mean that, proceeding from a central axis of the stepped mandrel, the tabs are designed such that they extend radially outward from the central axis, so that a lever arm can be formed radially outward from the central axis.

In a further variant of the invention, the tabs, at least in the region of a contact face on the mass inertia element, have a radius, in particular the contact faces can be spherical, so that a contact face that can be as reduced as possible, in particular a point contact between the tabs and the mass inertia element, can be produced. The spring preload can prevent undesired movement of the mass inertia element, but the spring preload also counteracts a movement of the mass inertia element relative to the plastics mandrel. By designing the contact face of the tabs on the mass inertia element in a linear or point form, the force to be introduced into the mass inertia element can be developed such that, although a necessary force can be transferred, the friction forces between the tabs and mass inertia element can be reduced to a minimum. Designing the tabs in order to introduce a spring preload to the mass inertia element, according to the invention, is therefore a further means for achieving high functional reliability using a low number of components, and can therefore be produced or provided cost-effectively.

BRIEF DESCRIPTION OF DRAWINGS

In the following, the invention is explained in greater detail by means of a preferred embodiment and with reference to the accompanying drawings. However, the principle applies that the embodiments of the invention are not limiting, but instead merely represent advantageous embodiments. The features shown can be implemented individually or in combination with other features of the description.

In the drawings.

DETAILED DESCRIPTION

Figure 1:
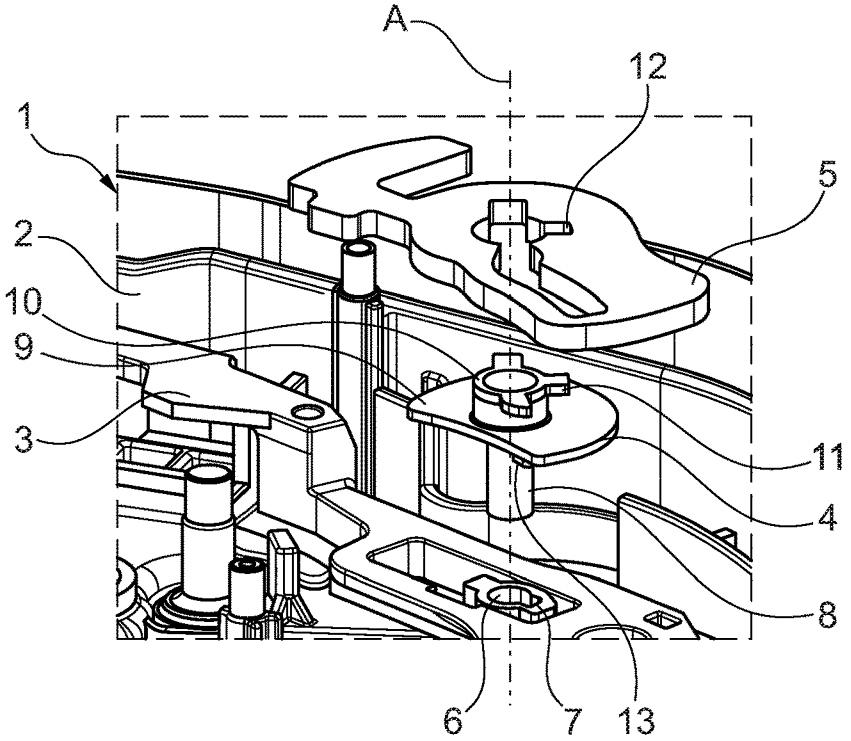
FIG. 1 is a three-dimensional view of a motor vehicle lock comprising a slider, a plastics mandrel and a mass inertia element.

FIG. 1 is a three-dimensional view of a motor vehicle lock 1 and shows only some of the components of the motor vehicle lock 1. The further components of the motor vehicle lock 1 are omitted on the grounds of better demonstrating the concept of the invention. FIG. 1 shows a housing 2, a sliding element 3, a plastics mandrel 4 and a mass inertia element 5. The mass inertia element 5 is fastened to the plastics mandrel 4 along an axis A, it being possible to introduce the plastics mandrel 4 into an opening 6 in the housing 2. An extension of the opening 7 can be seen in the opening 6, so that the plastics mandrel 4 can be introduced into the opening 6 in a form-fitting manner. In this embodiment, the plastics mandrel 4 can therefore be accommodated in the motor vehicle lock 1 so as to be secured against rotation.

The plastics mandrel 4 has a cylindrical lengthened portion 8 which extends through the housing 2. A joining face 9 is used as a counter-mounting for, for example, riveting the cylindrical lengthened portion and as a guide face for the sliding element 3. Moreover, the joining face 9 is tasked with securely guiding the mass inertia element 5 about the axis H during a pivot movement. In this embodiment, the joining face 9 is formed integrally and as a plastics injection-molded part with the plastics mandrel 4. The plastics mandrel 4 has a lengthened portion 10 which extends through the mass inertia element 5. Starting from the lengthened portion which extends through the mass inertia element 5, the plastics mandrel 4 has arms which extend outward from the plastics mandrel 4. The 3 arms 11 in this embodiment cooperate with recesses 12 in the mass inertia element 5, so that the arms 11 can be guided through the recesses 12 in the mass inertia element 5.

In order to mount the mass inertia element 5, the arms 11 of the plastics mandrel 4 are guided through the recesses 12 of the mass inertia element 5 and the mass inertia element 5 is subsequently rotated, the rotation of the mass inertia element 5 in relation to the plastics mandrel 4 being designed such that the mass inertia element 5 can move freely without the arms 11 coinciding with the recesses 12, so that reliable functioning and holding of the mass inertia element 5 can be achieved. In this embodiment, a bayonet-type catch is provided between the plastics mandrel 4 and the mass inertia element 5. After joining the mass inertia element 5 to the plastics mandrel 4 and introducing the plastics mandrel 4 into the opening 6, 7 in the housing 2, the plastics mandrel 4 is accommodated in the housing so as to be secured against rotation. For this reason, a thickened portion 13 extends into the extension 7 of the opening 6.

Figure 2:
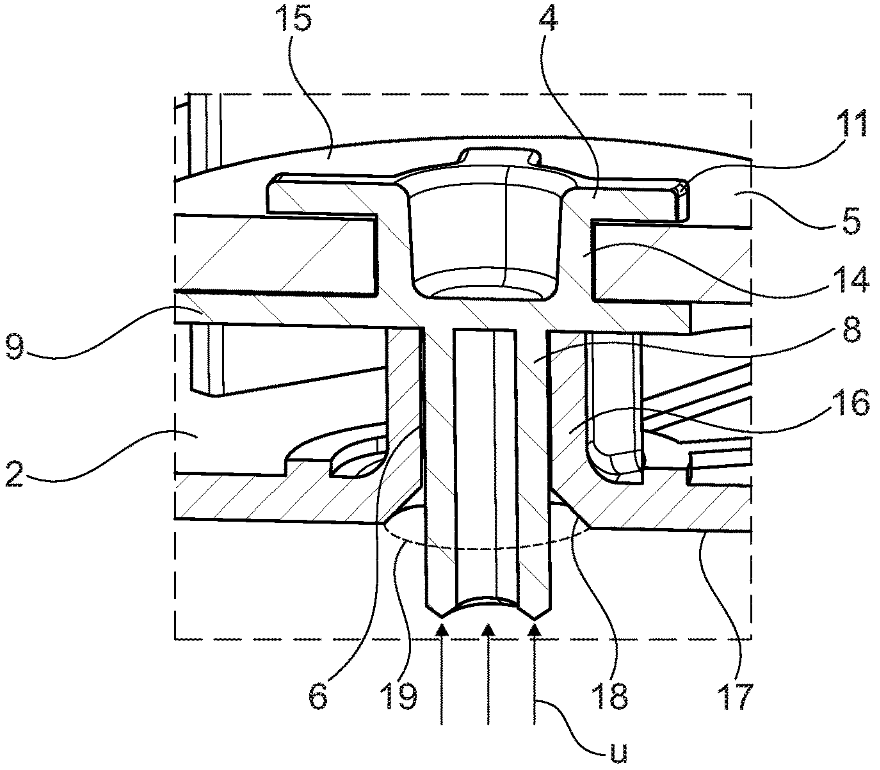
FIG. 2 shows a mounted mass inertia element on a plastics mandrel in a sectional view through a housing of a motor vehicle lock.

In FIG. 2, the mounted mass inertia element 5 is shown in a mounted position on a stepped mandrel 4 in the housing 2. The stepped mandrel 4 in this case forms a mounting face 14 for the mass inertia element 5, with the plastics mandrel 4 being held securely in position in the opening 6 or the opening 6 and the extension 7. The arms 11 of the plastics mandrel 4 extend away over the surface 15 of the mass inertia element 5 and therefore hold the mass inertia element 5 in an oriented position in the motor vehicle lock 1. In this case, the mass inertia element 5 is pivotably held in the motor vehicle lock 1 between the arms 11 and the joining face 9.

Starting from the joining face 9, the plastics mandrel 4 extends, by means of its cylindrical lengthened portion 8, through a sleeve-like protrusion 16 of the housing 2 and projects beyond the end 17 of the housing 2. The opening 6 is provided with chamfering 18 on the end of the housing 17, which chamfering can be used to accommodate the formed part of the cylindrical lengthened portion. If the cylindrical lengthened portion 8 and in particular the part of the cylindrical lengthened portion 8 that projects beyond the end 17 of the housing 2 is subjected to action thereon, for example by means of an ultrasonic method U, forming can take place, and this formed portion is introduced like a rivet head 19 into the opening 6 or the chamfering 18. The rivet head 19 is shown in FIG. 2 by a dotted line. By forming the cylindrical lengthened portion 8, a non-detachable connection between the plastics mandrel 4 and the housing 2 can be produced. The mass inertia element 5 therefore obtains a secure mounting point which can be produced from a plastics mandrel.

Figure 3:
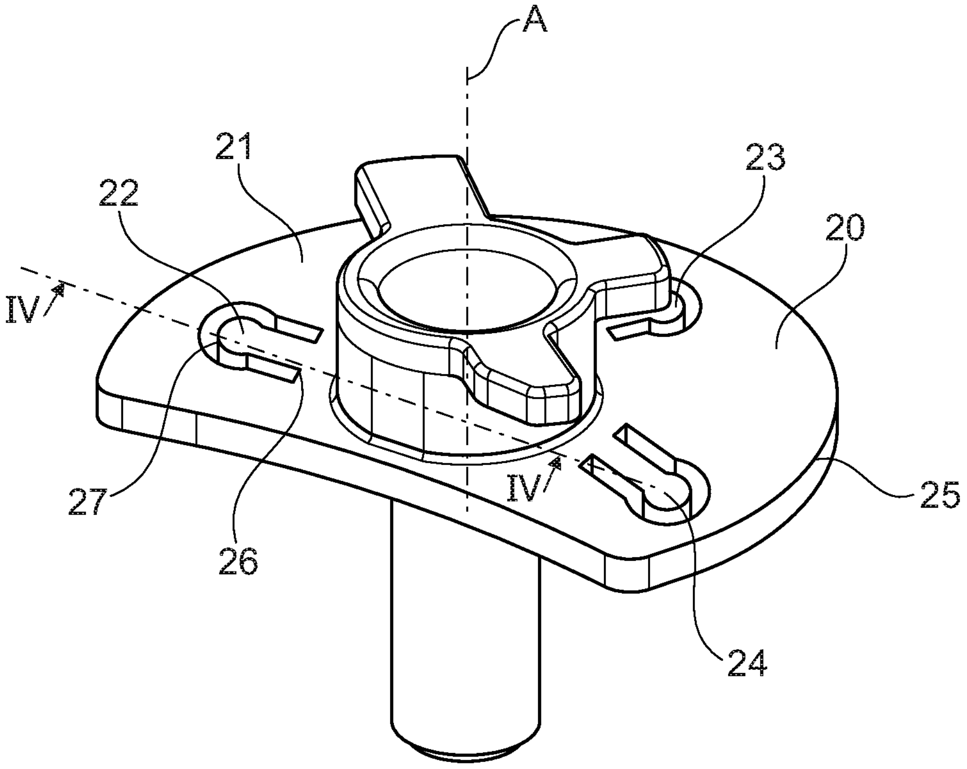
FIG. 3 is a three-dimensional view of a plastics mandrel comprising tabs that are molded in and intended for introducing a spring preload onto the mass inertia element.

FIG. 3 shows a further embodiment of a plastics mandrel comprising tabs 22, 23, 24 molded into a joining face 21. The tabs 22, 23, 24 are designed as integral components of the plastics mandrel 20. In this case, the tabs 22, 23, 24 extend radially outward from a central axis A of the plastics mandrel 20. The tabs 22, 23, 24 are in this case designed such that the tabs 22, 23, 24 protrude beyond a surface 25 of the joining face 21, provided that the mass inertia element 5 is not yet connected to the plastics mandrel 20 or the mass inertia element is not yet mounted on the plastics mandrel 20.

The tabs 22, 23, 24 can move freely, i.e. the tabs 22, 23, 24 extend radially outward from a connecting face 26, with the radially outer ends 27 resiliently abutting the mass inertia element 5. In this embodiment, three tabs 22, 23, 24 are molded into the joining face 21, but it is naturally also conceivable to provide further tabs 22, 23, 24 depending on the design of the mass inertia element 5 and required spring preload in the plastics mandrel 20.

Figure 4:
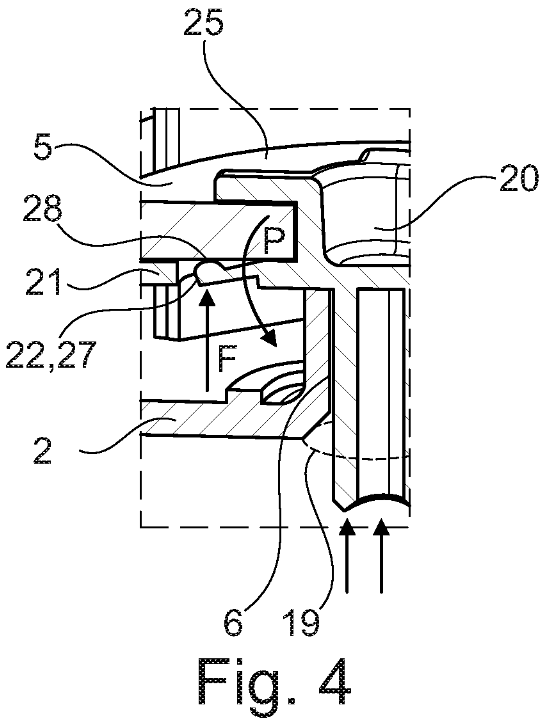
FIG. 4 is a sectional view along the line IV-IV from FIG. 3, in a mounted state together with the housing and mass inertia element.

FIG. 4 is a three-dimensional sectional view along a line IV-IV from FIG. 3. FIG. 4 shows the plastics mandrel 20 together with a mounted mass inertia element 5 in a housing 2. Equivalent components are provided with the same reference signs as the preceding figures. The plastics mandrel 20 has a tab 22 which introduces a force F as a spring preload into the mass inertia element 5. As can be seen in FIG. 4, the tab 22 has been pivoted in the direction of the arrow P during mounting of the mass inertia element 5, so that a spring preload F in the tab 22 is set which exerts a spring preload on the mass inertia element 5.

It can also clearly be seen that the tab 22 in this embodiment has a spherical contact face 28. This means that the tab 22 is spherical on its radially outer end 27 at least in the direction of the mass inertia element 5, so that a point contact is present between the tab 22 and the mass inertia element 5. During a relative movement between the mass inertia element 5 and the plastics mandrel 20, this therefore produces a minimal friction surface and therefore sliding friction.

LIST OF REFERENCE SIGNS

1 Motor vehicle lock
2 Housing
3 Sliding element
4, 20 Plastics mandrel
5 Mass inertia element
6 Opening
7 Extension
8 Cylindrical lengthened portion
9, 21 Joining face
10 Lengthened portion
11 Arm
12 Recess
13 Thickened portion
14 Mounting face
15, 25 Surface
16 Extension
17 End of the housing
18 Chamfering
19 Rivet head
22, 23, 24 Tab
26 Connecting face
27 Radially outer ends
28 Contact face
A Axis
U Ultrasound
F Force, spring preload

The invention claimed is:

1. A lock for a motor vehicle, the lock comprising:

an actuating lever chain having at least one actuating lever, wherein the actuating lever is configured to unblock a locking mechanism of the motor vehicle from a blocked position;

a mass inertia element mounted in the lock; and a plastics mandrel mounted in the lock, wherein the plastic mandrel includes an arm extending outward from the plastics mandrel which interacts with a recess in the mass inertia element and a joining face, wherein the arm and the joining face are arranged for sandwiching the mass inertia element between the joining face and the arm when the mass inertia element is attached to the plastics mandrel, wherein the mass inertia element is mounted in the lock by the plastics mandrel, wherein the joining face is configured so that a spring preload is introduced into the mass inertia element toward the arm to press the mass inertia element into direct contact with the arm, wherein the joining face has a planar surface, wherein the plastics mandrel further includes a plurality of flexible tabs molded into the joining face that protrude beyond the planar surface of the joining face, when the mass inertia element is not mounted on the plastics mandrel, and wherein the flexible tabs each includes a spherical surface that is configured to provide the spring preload into the mass inertia element.

2. The lock for the motor vehicle according to claim 1 further comprising a housing, wherein the plastics mandrel extends through at least part of the housing, and wherein a part of the plastics mandrel extending through the housing is connected to the housing by a forming method.

3. The lock for the motor vehicle according to claim 2, wherein the part of the plastics mandrel extending through the housing is ultrasonically welded to the housing.

4. The lock for the motor vehicle according to claim 1, wherein the plastics mandrel has at least one joining face for accommodating the mass inertia element.

5. The lock for the motor vehicle according to claim 1, wherein the plastics mandrel is frictionally, form-fittingly or integrally connected to the mass inertia element.

6. The lock for the motor vehicle according to claim 1, wherein the mass inertia element has at least one recess which corresponds to the plastics mandrel.

7. The lock for the motor vehicle according to claim 1, wherein the plastics mandrel is guided through the mass inertia element.

8. The lock for the motor vehicle according to claim 1, wherein the plastics mandrel is latched to the mass inertia element via a bayonet catch.

9. The lock for the motor vehicle according to claim 1, wherein the mass inertia element is made at least in part from a plastics material.

10. The lock for the motor vehicle according to claim 1, wherein the plastics mandrel is formed as a one-piece plastics injection-molded part.

11. The lock for the motor vehicle according to claim 1, wherein the spring preload is introduced into the mass inertia element by at least one tab molded into the joining face.

12. The lock for the motor vehicle according to claim 11, wherein the at least one tab includes at least two tabs that are inserted into the joining face symmetrically.

13. The lock for the motor vehicle according to claim 11, wherein the at least one tab extends radially outward in the joining face from a central axis.

14. The lock for the motor vehicle according to claim 11, wherein the at least one tab, at least in a region of a contact face on the mass inertia element, have a radius.

15. The lock for the motor vehicle according to claim 11, wherein the joining face includes two or more tabs.

16. The lock for the motor vehicle according to claim 14, wherein the at least one tab is configured to have a spherical shape to reduce an area of the contact face.

17. The lock for the motor vehicle according to claim 14, wherein the region of the contact face is formed as a line or point contact between the at least one tab and the mass inertia element.

18. The lock for the motor vehicle according to claim 1, wherein the flexible tabs each includes a radially outer end on which the spherical surface is located and the spherical surface extends from the radially outer end to provide the spring preload.

* * * * *